Nov. 8, 1927.
J. H. BAKER
1,648,211
AUTO BUMPER CLAMP LUGGAGE CARRIER
Filed Jan. 25, 1927
2 Sheets-Sheet 1
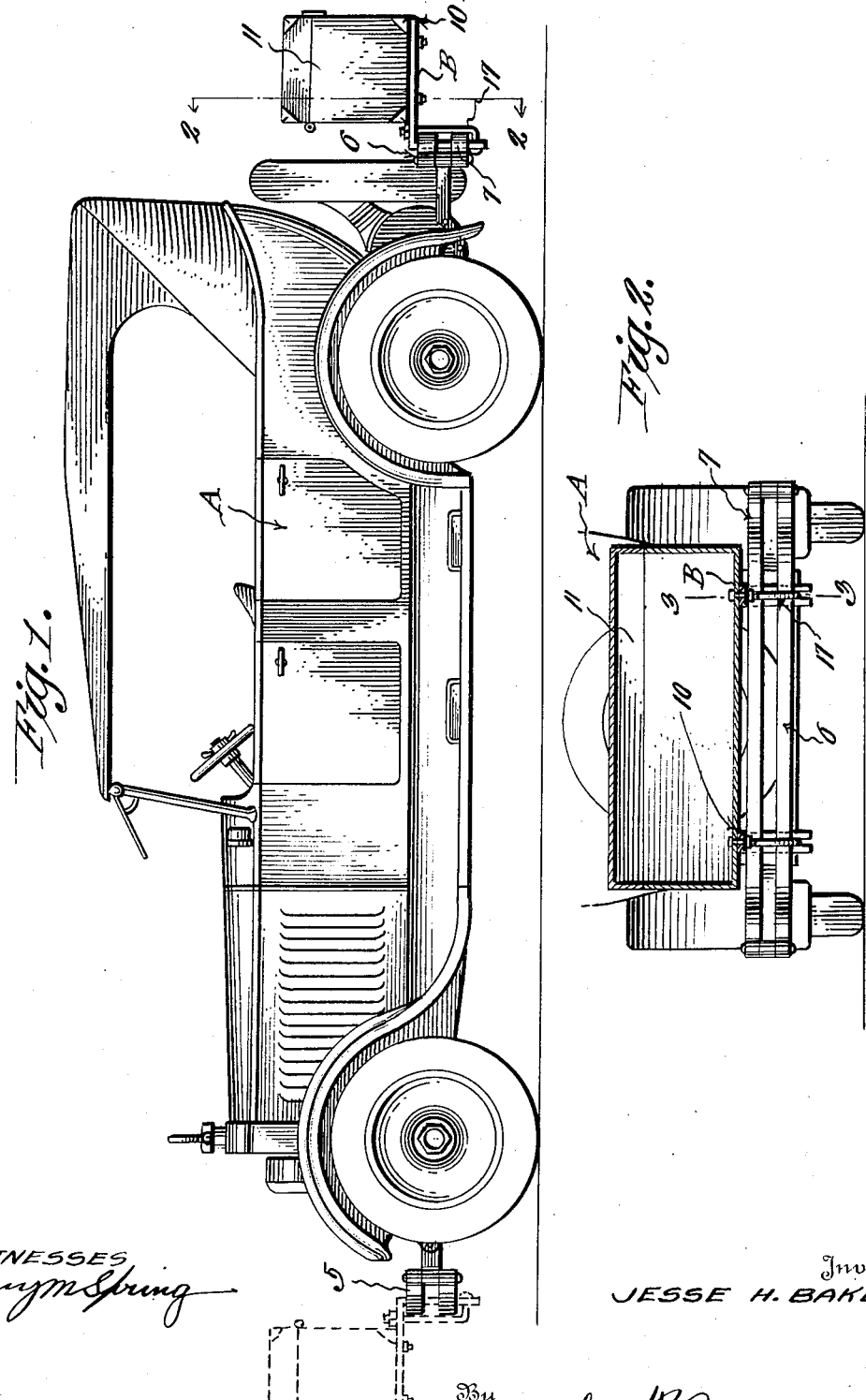
WITNESSES
Inventor
JESSE H. BAKER
By Richard B. Owen, Attorney Nov. 8, 1927.  1,648,211
J. H. BAKER
AUTO BUMPER CLAMP LUGGAGE CARRIER
Filed Jan. 25, 1927   2 Sheets-Sheet 2
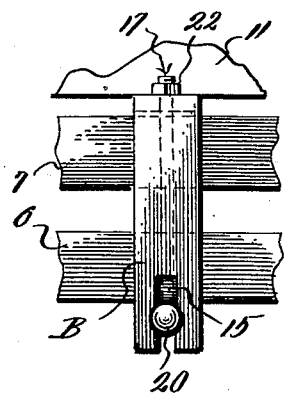
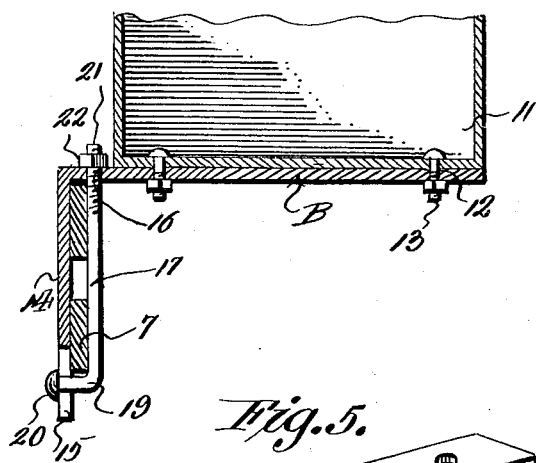
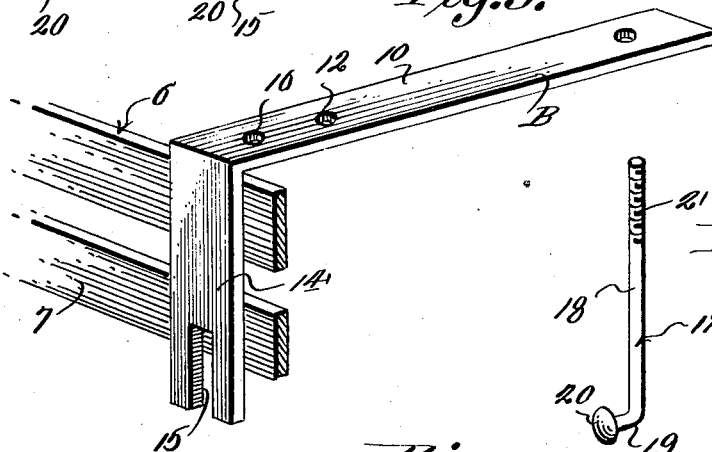
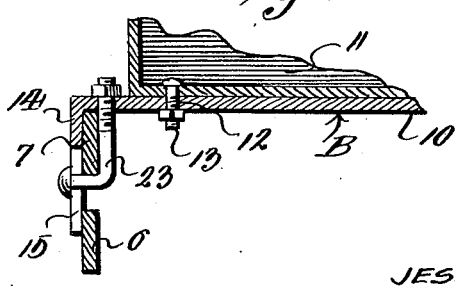
Inventor
JESSE H. BAKER Patented Nov. 8, 1927.

1,648,211

UNITED STATES PATENT OFFICE.

JESSE H. BAKER, OF PHOENIX, ARIZONA.

AUTO BUMPER-CLAMP LUGGAGE CARRIER.

Application filed January 25, 1927. Serial No. 163,508.

This invention appertains to attachments for motor vehicles and more particularly to a novel luggage carrier.

One of the primary objects of the present invention is to provide novel means for rigidly connecting a luggage carrier with the bumper of a motor vehicle and thereby eliminating the necessity of connecting the carrier with the brackets for said bumper.

Another salient object of the invention is the provision of a luggage carrier having a novel clamp for detachable connection with the bumpers of automobiles, the carrier and clamp being so constructed as to permit the firm gripping of bumpers of different sizes and makes, the carrier clamp being substantially of a universal character.

A further object of the invention is the provision of a luggage carrier and clamp which is readily adjustable to different widths of bumpers.

A still further object of the invention is to provide an improved device of the above character, which will be durable and efficient in use, one that will be simple and easy to manufacture and one which can be placed upon the market and incorporated with the vehicle at a low cost.

With these and other objects in view, the invention consists in the novel construction, arrangement and formation of parts, as will be hereinafter more specifically described, claimed, and illustrated in the accompanying drawings, in which drawings:

Figure 1 is a side elevation of an automobile showing the improved luggage carrier and clamp incorporated therewith, Figure 2 is a transverse section taken on the line 2—2 of Figure 1, Figure 3 is a vertical section taken on the line 3—3 of Figure 2 illustrating the novel engagement of the clamp and carrier with a vehicle bumper, Figure 4 is a fragmentary front elevation illustrating the connection of the carrier clamp with the bumper, Figure 5 is a detail perspective view showing one of the luggage carrier bars with its attaching foot in engagement with the bumper, the bumper being partly broken away and in section, Figure 6 is a detail perspective view of the novel clamping bolt utilized in conjunction with the carrier and attaching foot, Figure 7 is a detail section similar to Figure 3 showing the carrier and clamp connected with a single bar of a bumper.

Referring to the drawings in detail, wherein similar reference characters designate corresponding parts throughout the several views, the letter A indicates an automobile and B the novel luggage carrier.

The automobile A can be of any preferred type or style and as shown is provided with front and rear bumpers 5 and 6. These bumpers 5 and 6 can be connected to the chassis of the vehicle in any preferred way and the bumpers themselves can be of any desired type or style. As shown the bumpers include flat bumper bars 7.

The improved device B comprises a pair of flat luggage carrying bars 10 upon the upper surface of which is adapted to be fitted a trunk 11 or the like. As shown the bars 10 are provided with bolt openings 12 for the reception of bolts 13 for permitting the rigid attaching of the trunk 11 to the said luggage bars. The inner ends of the bars 10 are provided with depending right angularly extending attaching feet 14 which form one of the salient features of the invention. As clearly shown in Figures 4 and 5 of the drawings the lower ends of the feet 14 are bifurcated or provided with adjusting slots 15 for a purpose, which will be hereinafter more fully disclosed. It is to be also noted that the luggage bars 10 adjacent to the attaching feet 14 and inward of the bolt holes 12 are provided with clamp openings 16 as will be also later described. The feet 14 are fitted against the inner face of the bumper bars 7 with the luggage bar 10 resting upon the uppermost bar of the bumper.

Operating in conjunction with the attaching feet 14 are novel clamping bolts 17. These bolts 17 each include a shank portion having their lower ends provided with right angular arms 19 which terminate in heads 20. The upper ends of the shanks 8 are threaded as at 21 for the reception of the adjusting and locking nuts 22.

After the luggage bars 10 are placed on the bumper bars 7 with the feet portions engaging the inner faces of said bumper bars, the right angular arms 19 of the bolts 17 are placed in the adjusting slots of the feet 14 and the threaded ends 21 of the shanks of the bolts are slipped through the openings 16. The heads 20 of the bolts engage the inner faces of the feet 14, while the shank portions 18 engage the outer faces of the bumper bars. The adjusting nuts 22 are now threaded on the bolts until the arms 19 thereof are drawn into intimate contact with the bumper bars and the luggage bars 10 in firm contact with the uppermost bumper bar after which these nuts can be locked in position in any desired way. These luggage bars 10 form convenient means for carrying trunks or the like and the feet 14 operate in conjunction with the bolts 17 to hold the luggage bars firmly in position against turning or swinging movement. It is obvious that through the means of the slots 15 that various sizes of bumper bars can be accommodated which practically make the luggage carrier and clamp of a universal nature for all kinds of bumpers. As shown in Figure 1 in dotted lines the luggage carrier and clamp can be associated with the front bumper or vehicle if preferred. In Figure 7 of the drawings I have shown a relatively short clamping bolt 23 and in this instance the bolt only engages one of the bumper bars. Luggage bars 10 may be attached to bumpers in a reverse position, if desired; that is, with bars 10 extending inward toward the car, then, when so attached throughout this description, where the words "inner surfaces" occur, should read outer surfaces and where the words "outer surfaces" occur, should read inner surfaces. By using long or short bolts, the luggage carrier can be associated with the bumper consisting of only one bar or more.

Changes in details may be made without departing from the spirit or scope of this invention, but:

What I claim as new is:

1. The combination with an automobile bumper including a bar, of a luggage carrier including luggage supporting bars and rigid attaching feet, and means operating in conjunction with the luggage bars and feet for clamping the said luggage bars on the bumper bar.

2. The combination with an automobile bumper including a bumper bar and a luggage carrier including supporting bars and right angular rigid attaching feet formed thereon, of adjustable means detachably associated with the feet and supporting bars for clamping contact with the bumper bar.

3. The combination with an automobile bumper including a bumper bar and a luggage carrier including supporting bars and right angular rigid attaching feet formed thereon for contact with the bumper bar, of means for detachably connecting the carrier with the bumper bar including clamping bolts adjustably associated with the attaching feet and supporting bars for intimate contact with the bumper bar.

4. The combination with an automobile bumper including a bumper bar, a luggage carrier comprising a pair of spaced luggage supporting bars and right angularly extending attaching feet, the feet engaging the inner face of the bumper bar and the supporting bars the upper edge of the bumper bars, the supporting bars being movable toward and away from one another to accommodate different lengths of luggage to be carried, of adjustable and removable means for connecting the bars with the bumpers including clamping bolts adjustably associated with the attaching feet and supporting bars for intimate contact with the bumper bars.

5. The combination with an automobile bumper including a bumper bar and a luggage carrier comprising a spaced pair of supporting bars and depending right angular feet for contact with the inner face of the bumper bar, the lower terminals of the feet being provided with adjusting slots, the supporting bars being provided with bolt receiving opening, of means for adjustably and detachably connecting the luggage carrier with the bumper including a pair of bolts having vertical shanks provided with right angular arms, the arms being extended through the slots in the feet and provided with heads, the upper ends of the shanks being threaded and fitted through the bolt openings in the supporting bars, the bolts being adapted to engage the face of the bumper bar opposite to the face engaged by the feet, and adjusting nuts threaded upon the shanks in contact with the supporting bars.

6. A luggage carrier and clamp for automobile bumpers comprising a pair of spaced supporting bars, right angularly disposed depending attaching feet formed on the inner ends of said bars, the lower terminals of the feet being provided with inwardly directed slots, the supporting bars being provided with bolt receiving openings, clamping bolts including shanks having their upper terminals threaded and fitted through said openings and their lower terminals provided with right angularly extending arms slidably mounted in the slots of the attaching feet, heads formed on said arms for engaging the feet, and adjusting nuts threaded on said shanks.

In testimony whereof I affix my signature.

JESSE H. BAKER.